US005517849A

United States Patent [19]
Sisbarro et al.

[11] Patent Number: 5,517,849
[45] Date of Patent: May 21, 1996

[54] APPARATUS AND METHOD INCLUDING POROUS LINER FOR TESTING FOR HOLES IN PROPHYLACTIC DEVICES

[75] Inventors: Frederick P. Sisbarro, Wayne; Glenn W. Thomsen, Cream Ridge; Thomas D. Sullivan, Robbinsville, all of N.J.

[73] Assignee: Carter-Wallace, Inc., New York, N.Y.

[21] Appl. No.: 356,497

[22] Filed: Dec. 15, 1994

[51] Int. Cl.[6] .............................. G01M 3/26; G01N 3/04
[52] U.S. Cl. ...................... 73/40; 73/49.2; 73/41
[58] Field of Search .................. 73/40, 49.2, 49.3, 73/41

[56] References Cited

U.S. PATENT DOCUMENTS

| | | | |
|---|---|---|---|
| 2,126,434 | 8/1938 | Vosbury | 73/51 |
| 2,370,945 | 3/1945 | Fields | 73/37 |
| 2,567,926 | 9/1951 | Dunkelberger | 128/294 |
| 2,855,777 | 10/1958 | Garrett | 73/40 |
| 2,855,926 | 10/1958 | Koppelman | 128/203 |
| 3,177,704 | 4/1965 | Stange | 73/49.3 |
| 3,315,519 | 4/1967 | Ferguson | 73/40 |
| 3,389,811 | 6/1968 | Frank | 214/6.5 |
| 3,667,862 | 6/1972 | Parr | 416/61 |
| 3,805,593 | 4/1974 | Sandoz et al. | 73/49.2 |
| 3,991,604 | 11/1976 | Hayes et al. | 73/37 |
| 3,992,766 | 11/1976 | Field | 29/235 |
| 4,002,055 | 1/1977 | Kops | 73/40 |
| 4,118,972 | 10/1978 | Goeppner et al. | 73/40 |
| 4,206,631 | 6/1980 | Nysse et al. | 73/40 |
| 4,683,745 | 8/1987 | Broughman, Jr. et al. | 73/49.2 |
| 4,855,169 | 8/1989 | McGlothlin et al. | 428/35.2 |
| 4,875,358 | 10/1989 | Marsh et al. | |
| 4,954,309 | 9/1990 | McGlothlin et al. | 264/307 |
| 5,073,482 | 12/1991 | Goldstein | 435/5 |
| 5,129,256 | 7/1992 | McGlothlin | 73/40 |
| 5,163,313 | 11/1992 | Haas, Jr. et al. | 73/41 |
| 5,255,558 | 10/1993 | Hamilton | 73/40 |
| 5,327,775 | 7/1994 | Epshetsky | 73/40 |
| 5,390,531 | 2/1995 | Taylor | 73/40 |
| 5,438,861 | 8/1995 | Sisbarro et al. | 73/40 |

FOREIGN PATENT DOCUMENTS 1182326A 9/1985 U.S.S.R. .

OTHER PUBLICATIONS

Cosmo Product Brochure, Cosmo Instruments Co., Ltd., Bulletin 927H–4M, 8 pages.
Porex Technologies, Product Brochures, ID #661–330–1098, 1989; #675330190, 1990; #79133072, 1992; #152330388, 1990; #578330388, 1990; #725330291, 1992; #152330388, 1992; #586330688, 1990; #725330291, 1990; #788330692, 1992; #586330688, 1990.

*Primary Examiner*—Hezron E. Williams
*Assistant Examiner*—J. David Wiggins
*Attorney, Agent, or Firm*—Watov & Kipnes

[57] ABSTRACT

A system for testing a condom includes a housing containing a porous liner having an interior cavity conformed to the exterior shape of a condom to be tested, whereby a holder carrying the condom is inserted into the liner, a closed pathway for gas flow is provided between a gas port of the holder and the interior volume of the condom, for permitting the condom to be inflated with the gas, causing the exterior walls of the condom to be pushed against opposing inside walls of the liner, permitting gas passing through holes in the condom to flow through pores in walls of the liner to another gas port of the housing for detecting unacceptable holes in the condom using differential pressure techniques and/or gas tagging.

25 Claims, 11 Drawing Sheets

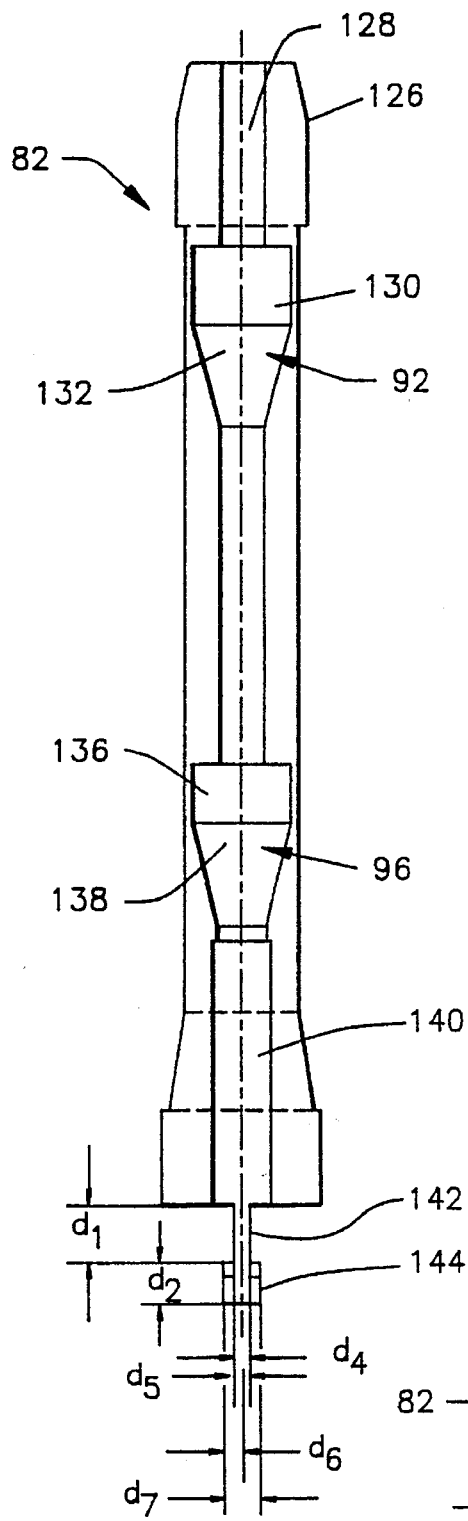
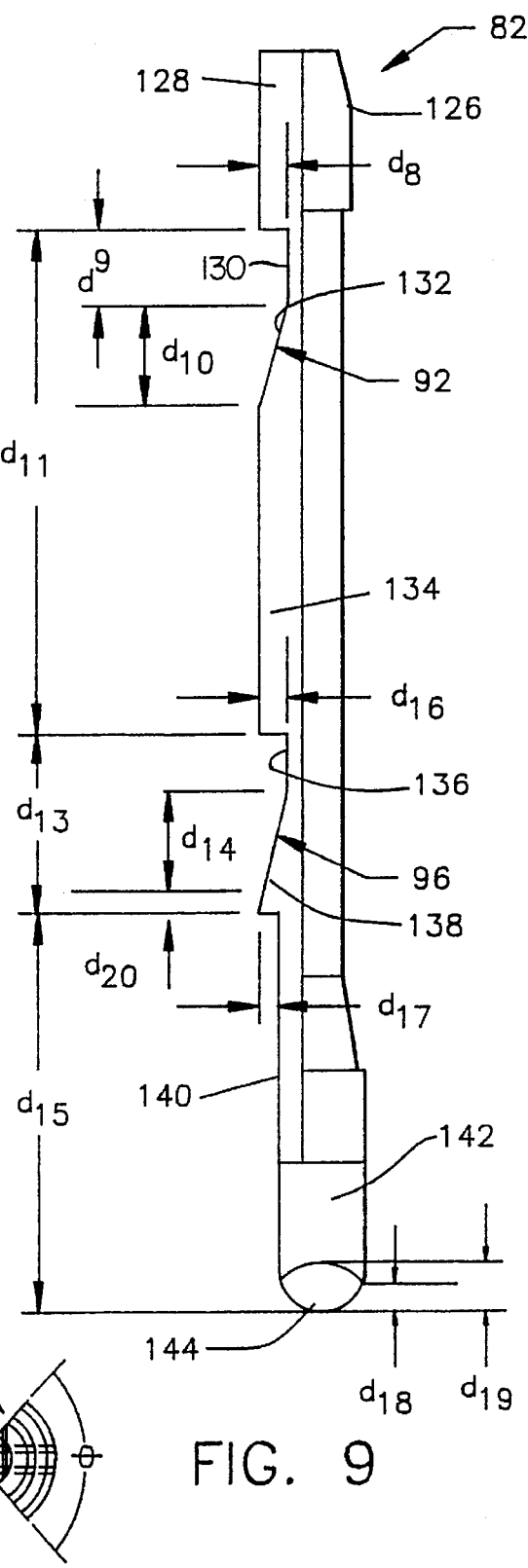
FIG. 8
FIG. 10
FIG. 9

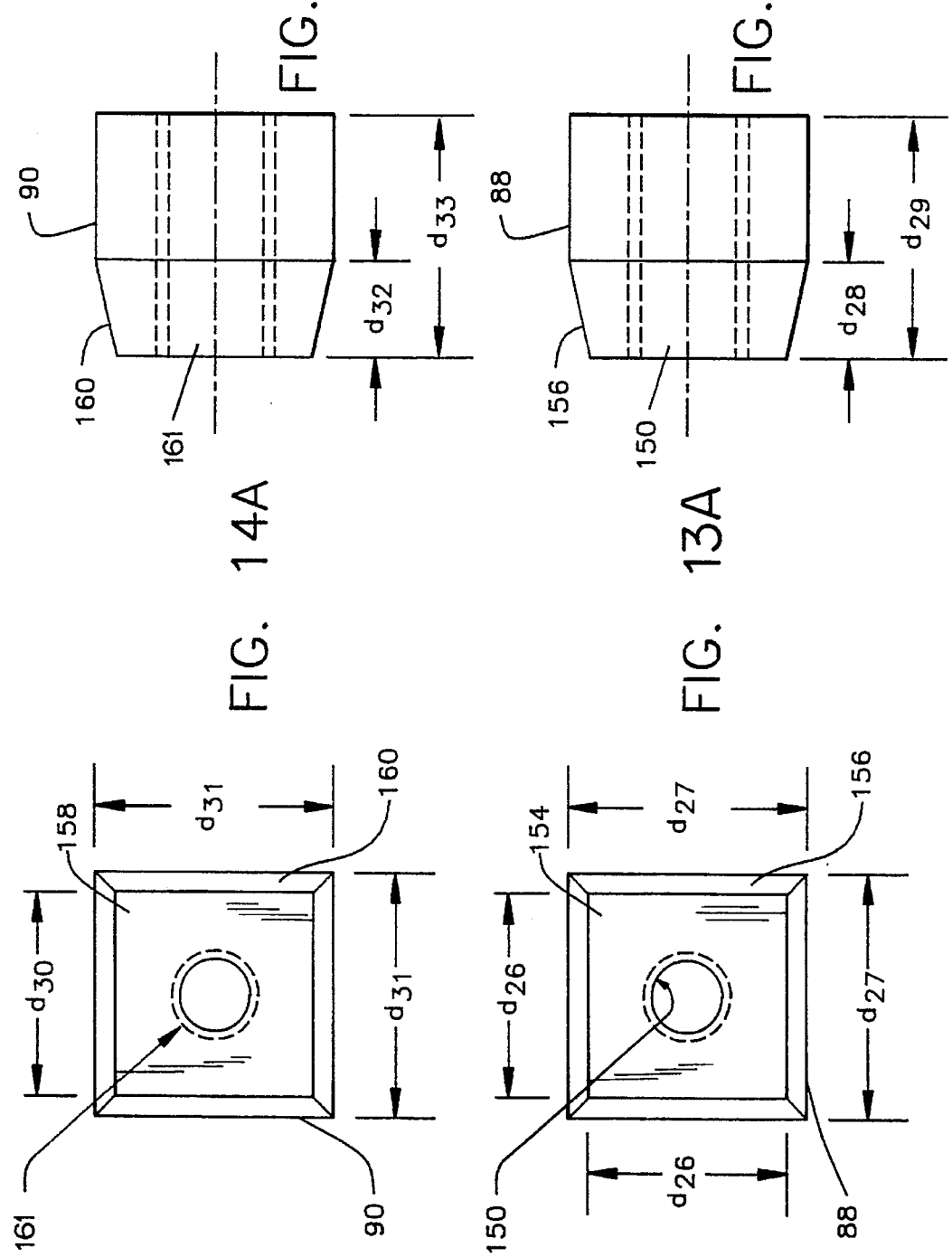

APPARATUS AND METHOD INCLUDING POROUS LINER FOR TESTING FOR HOLES IN PROPHYLACTIC DEVICES

FIELD OF THE INVENTION

This invention is in the field of testing the integrity of prophylactic devices, including condoms, gloves, and other thin walled devices of elastic material, for example.

RELATED INVENTION

This invention is related to the invention of application U.S. Ser. No. 08/277,098, filed Jul. 19, 1994, for "Apparatus And Method For Testing For Holes In A Prophylactic Device", having a common assignee herewith, and which became U.S. Pat. No. 5,438,861 on the date of Aug. 8, 1995.

BACKGROUND OF THE INVENTION

Whereas the reliability of prophylactic devices such as condoms has always been important, the prevalence of AIDS and the alarming increase in unwanted pregnancies has placed even greater emphasis on detecting holes through which body fluids may pass. At the same time, it is important that the testing for holes be done as economically as possible. Ideally, no defective condoms should pass a test for holes and no acceptable condoms should fail it. It is the understanding of the inventors that the FDA requires testing for holes as small as 10 microns.

A number of testing methods are available. They include a water leak test in which the condom is filled with water and an operator visually checks its outer surface for water droplets. Small holes in the condom result in extremely small water droplets on the surface. These droplets are difficult to see even if the hole location is known before the test is performed. Under actual operating conditions, the failure to detect such a small water droplet could result in the acceptance of a defective condom. Unless extreme care is used, water droplets can be inadvertently deposited on the condom so that acceptable condoms are rejected. Furthermore, it is difficult for an operator to continue to keep a sharp eye out for the droplets. In addition to these difficulties, the inspection of a condom for droplets takes a long time.

Holes can also be detected by electrical methods. In a "wet test", a condom is stretched over a mandrel of conductive material and immersed in a conductive aqueous solution. A low voltage is applied between the mandrel and the solution so that the flow of current in the circuit thus formed indicates a hole. In a "dry test" method, the condom is stretched over a conductive mandrel and conductive brushes or a fine steel screen is placed in contact with the outer surface of the condom. Voltage is applied between the mandrel and the brush or screen so as to produce a current if there is a hole in the condom. But such methods do not work well for condoms made of certain non-latex material, such as polyurethane, for example.

U.S. Pat. No. 5,129,256 describes a method and apparatus for testing condoms by mounting them on a hollow porous mandrel, drawing a partial vacuum in the space within the mandrel and monitoring the interior of the porous liner for gas flowing through its walls with a vacuum pressure transducer. It is indicated that preferably the mandrel have an outside diameter that is less than the inside diameter of a condom. The pore openings in the wall are distributed substantially uniformly over its external surface and preferably have a median diameter ranging from ten to fifty microns with a preferred median diameter of twenty microns. The porous part of the mandrel is comprised of a cylindrical body that is closed off at one end, has a wall thickness between 0.04 to 0.50 of an inch and a void volume between 35% and 60%.

If the mandrel is made by sintering particles, fine pores are desired because the dimensions of the walls between pores at the surface of the mandrel are smaller and thus less likely to block a hole in a condom that is stretched over it.

SUMMARY OF THE INVENTION

In this invention, a condom or other prophylactic device is mounted within a hollow central portion of a porous liner preferably having a corresponding shape, and a differential in pressure is established between the inside of the condom and the space outside of the porous liner. The differential can be obtained by increasing the pressure in the space inside the condom while the space outside the porous liner is at a predetermined pressure such as atmospheric pressure; or by creating a partial vacuum outside the porous liner while the space inside the condom is at atmospheric pressure. The differential in pressure is established during a first period, in which the condom is inflated. The pressure within the condom is allowed to stabilize during a second period, and the rate of change of the pressure differential between the interior of the condom and outside the porous liner is tested within a third period, for determining if it exceeds a given value so as to indicate the presence of a leak through a hole in the condom. During the second and third periods, in one embodiment of the invention, gas passing through a hole in the condom increases the pressure within a confined region about the porous liner so as to provide an integrated effect, if the interior has a higher pressure or if the confined space outside the porous liner and condom is at a lower pressure than interior to the porous liner. Pressures are tested at the beginning and end of the third period, and the change during each test is compared to previously determined calibration limits to determine the acceptability of the condom.

In accordance with an aspect of this invention, the determination made during the third period referred to above as to whether the pressure in the confined space or region outside the porous liner and condom is increasing rapidly enough to indicate a leak is made by comparing it (pressure increase) with a standard pressure. If it is greater than a predetermined value, a leak is present, but if it is not greater there is no leak. This is a more accurate method than making an absolute measurement of the pressure external to the condom with a transducer.

As noted in the background section, from a theoretical viewpoint, the smaller the pores at the surface of the porous liner, the smaller the holes that can be detected in a condom. In accordance with an important aspect of this invention, the size of pores in the portion of the porous liner that will be adjacent the body portion of a condom during a test is small enough to detect holes of an acceptable minimum size at any point in the condom.

BRIEF DESCRIPTION OF THE DRAWINGS

Various embodiments of the present invention are described below with reference to the drawings, wherein similar items are identified by the same reference designation, in which:

FIG. 8 is a front elevational view of a finger of the expandable condom holder of FIG. 2;

FIG. 9 is a side elevational view of the finger of FIG. 8;

FIG. 10 is a top view of the finger of FIG. 9;

FIG. 13A is a front elevational view of a first cam section of the cam rod subassembly of FIG. 11;

FIG. 13B is a side elevational view of the first cam section of FIG. 13A;

FIG. 14A is a front elevational view of a second cam section of the cam rod subassembly of FIG. 11;

FIG. 14B is a side elevational view of the cam section of FIG. 14A;

DETAILED DESCRIPTION OF THE INVENTION

Figure 1:
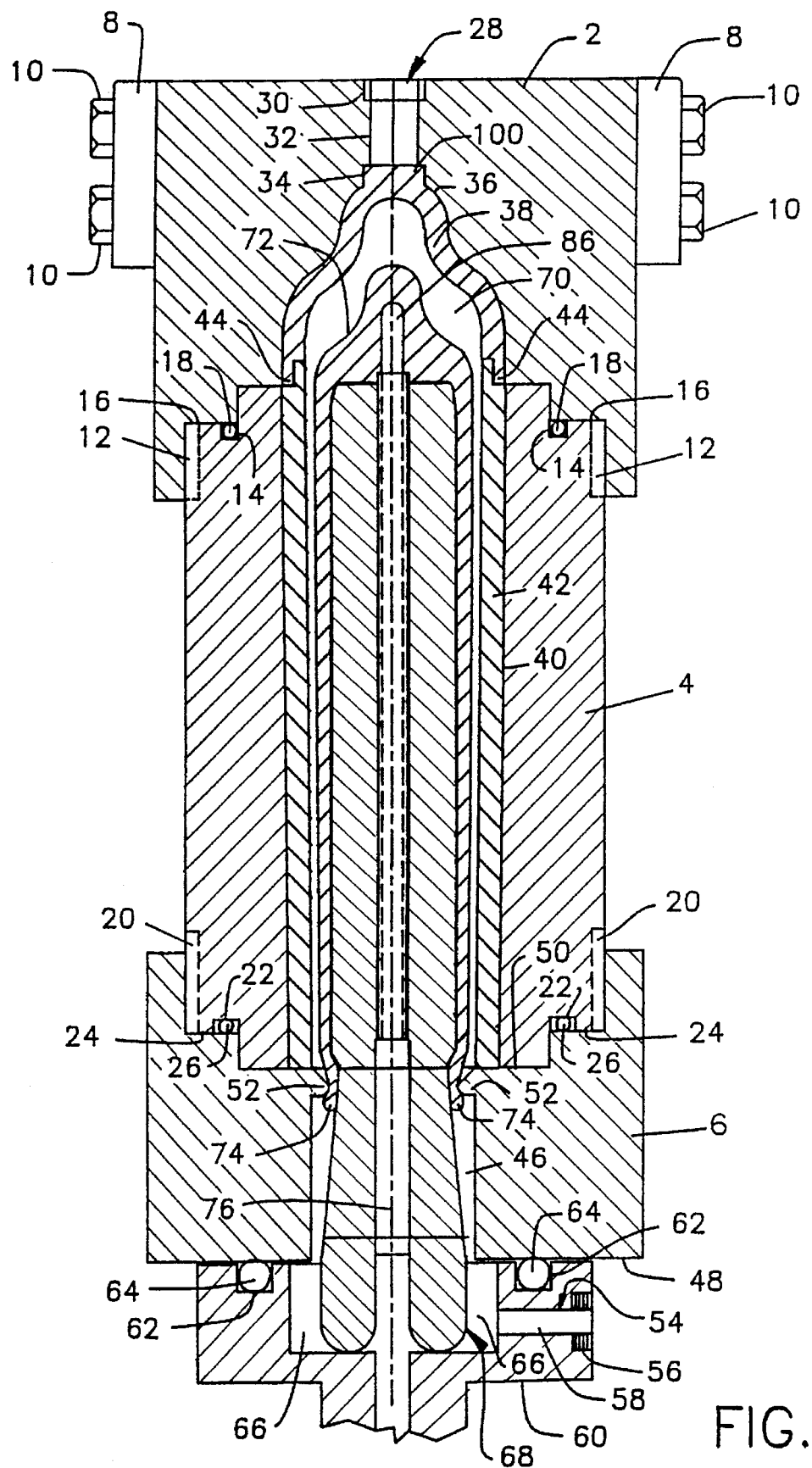
FIG. 1 is a cross sectional diagram of one embodiment of the invention including a non-expandable condom holder.

As shown in FIG. 1, a first embodiment of the invention comprises a housing of appropriate material, such as stainless steel or aluminum, for example, consisting of three sections; namely, a top housing section 2, an intermediate housing section 4, and a bottom housing section 6. In another embodiment of the invention a bracket 8 is secured to the top housing section 2 via bolts 10, whereby the other end of the bracket 8 is rigidly secured to a portion of a slide mechanism to be discussed below. The intermediate housing section 4 screws into the top housing section 2 via inter-cooperating threaded portions 12 therebetween. A channel 14 is provided in a stepped-down shoulder portion 16 of intermediate housing section 4, for retaining an O-ring 18, for providing an airtight seal between the top housing section 2 and intermediate housing section 4. Similarly, a bottom portion of the intermediate housing section 4 is screwed into a top portion of the bottom housing section 6 via cooperative threads 20, as shown. A channel 22 is formed about the inter-circumference of a stepped-down shoulder portion 24, relative to the bottom of intermediate housing section 4, for retaining an O-ring 26. The O-ring 26 provides an airtight seal between the bottom of the intermediate housing section 4 and bottom housing section 6. Note that the housing formed by sections 2, 4, and 6, as described, can for the purposes of the present invention be oriented in any desired manner, whereby for the sake of convenience, sections 2, 4, and 6 have been herein identified as top, intermediate, and bottom sections, respectively. Accordingly, such illustrative identification means is not meant to be limiting. Also, in this example, the housing sections 2, 4, and 6 are generally cylindrical in shape, which although preferred can have any other desired and practical shape.

The top housing section 2 includes a topmost and centralized air port 28 including a threaded upper portion 30 for receiving a mating threaded male portion of a connector for an air line or conduit (not shown). In this example, the intermediate portion of the air port 28 includes an air passageway 32 that terminates into a shallow air chamber 34 of increased diameter relative to the intermediate passage way 32. The shallow air chamber 34, in turn opens into a generally bell shape cavity 36 for receiving the top section 38 of a porous liner, discussed in greater detail below. Note also that the shallow air chamber 34 receives a central hub portion 100 of porous liner section 38.

The intermediate housing section 4 further comprises a centrally located cylindrical cavity or chamber 40 for retaining a bottom section 42 of the previously mentioned porous liner. As shown, the shapes of the bottom portion of the top section 38, and top portion of the bottom section 42, respectively, of the porous liner are configured for joining together via inner wall portions, while leaving a relatively narrow exterior gap or radial groove 44 therebetween. As will be shown in greater detail below, the groove 44 avoids having to align longitudinal grooves in and between the top and bottom porous liner sections 38, 42, respectively (see FIGS. 3, 5, 6, and 7).

The bottom housing section 6 includes a centrally located cylindrical cavity 46, in this example, extending from the bottom portion 48 thereof, towards a stepped-down or reduced diameter top portion 50, but terminating below this top portion 50, wherebetween a metal seal ring 52 is formed in the uppermost portion of the cavity 46 proximate an opening through the top surface 50.

In the embodiment of FIG. 1, a movable platform 60 is shown positioned proximate the bottom surface 48 of the bottom housing section 6. The platform 60 includes a circular groove or channel 62, in this example, for retaining an O-ring 64, to provide an airtight seal with the bottom 48 of bottom housing section 6, whenever platform 60 is positioned as shown for compressing the O-ring 64 therebetween. A horizontally oriented air port 54 includes a threaded entry portion 56 for receiving a mating connector of an air line (not shown), and an air passageway 58 opening into the cavity 66, as shown. The movable platform 60 is also shown to be carrying partially within a recessed centrally located cavity 66 a lower-most portion of a nonexpandable condom holder 68. Through such positioning of the movable platform 60, as shown, the major portion of the condom holder 68 is retained within the hollow cavity 70 formed between the top section 38 and bottom section 42 of the porous liner. The condom holder 68, in this example, is shown with a condom 72 positioned around its outside surface, with the bottom open end of the condom 72 being pressed between the metal seal ring 52 of the lower housing section 6 and the opposing opposite outside wall portion of the condom holder 68, thereby forming an airtight seal.

The condom holder 68, in this example, is nonexpandable and is formed to be substantially cylindrically shaped with a centrally located air passageway 76. The outside shape of the condom holder 68 is configured to support the condom 72 or other prophylactic device to be tested for leaks, during insertion into the test chamber, but the condom holder 68 is preferably of smaller diameter than the condom 72 to allow the condom 72 to slide easily onto it. However, in certain applications condom holder 68 may be of the same or greater diameter than the condom 72.

As will be shown in greater detail below, from a simplified standpoint, a condom so positioned as shown in FIG. 1 is tested by injecting pressurized air into air port 54, wherefrom the air flows through cylindrical cavity 66 of the movable platform 60, around the bottom of the condom holder 68 via air passageways (not shown) leading into the central air passageway 76, and there through into the condom 72, for inflating the condom. Typically, the condom 72 is expanded from less than 12% to greater than 15%, with 12% to 15% being the typical range, during such inflation or pressurization, causing it to conform to the interior shape of porous liner 38, 42. In this example, the air pressure source 200 (see FIG. 16) provides air at a pressure up to 100 pounds per square inch, for example. The condom is tested at pressures ranging from less than 20 pounds per square inch to greater than 100 pounds per square inch, with 20 pounds to 100 pounds being the typical range. After the condom is inflated, the air port 28 is sealed off from the atmosphere, whereafter a sufficient period of time is provided for permitting the pressure to stabilize in the spaces between the porous liner sections 38 and 42, and the housing sections 2, 4, and 6, respectively. Thereafter, the rate of change of pressure increase within air port 28 is measured against a standard rate of change, for determining whether any leaks exist in the condom 72. If leaks do exist, air flows from inside the condom 72, which has expanded to be tightly forced against the interior walls of the porous liner sections 38 and 42, through opposing pores of the porous liner, and through open air paths provided in the exterior walls of the porous liner or the cylinder itself (to be described in detail below), into the air passageway 32, causing a change in pressure in air port 28. Note that for the example shown herein, grooves are provided for the air paths. The degree of pressure change measured within air port 28 determines whether a condom 72 is accepted or rejected, dependent upon the magnitude of the rate of pressure increase over predetermined periods of time in air passageway 32, as previously described.

After a condom 72 is so tested, the air ports 28 and 54 are vented to the atmosphere, causing the condom 72 to deflate back onto the condom holder 68. Thereafter, the movable platform 60 is lowered, or moved away from the housing sections 2, 4, and 6. When the condom holder 68 is so removed from the porous liner sections 38 and 42, and housing sections 2, 4, and 6, respectively, the condom 72 is removed from the condom holder 68 (typically by rolling it off holder 68), and is packaged for sale if accepted, or disposed of if rejected. Alternatively, to save time, rejected condoms 72 may be blown off of the condom holder 68 via means for injecting high pressure air into the air passageway 76 of condom holder 68. Note that in withdrawing the condom 72 on condom holder 68 from the porous liner sections 38 and 42, in certain applications it is preferred at such times to vent air port 54 to the atmosphere, while injecting slightly pressurized air into air port 28, to insure the condom 72 more easily and rapidly frees itself from the inside walls of the porous liner sections 38, 42, rather than sticking thereto. Note also, as shown in FIG. 1, that the condom bottom portion 74 near the opening of the condom 72 is typically configured as a circular rim of greater thickness than other portions of the condom 72. However, the operation of the present invention, as described, is not dependent upon a condom having such a feature. Also, the present invention is not meant to be limited to testing condoms, but can with modification be applied for testing many other prophylactic articles, such as rubber or synthetic gloves, sterile rubber finger tips, elastic tubes, and so forth.

Figure 2:
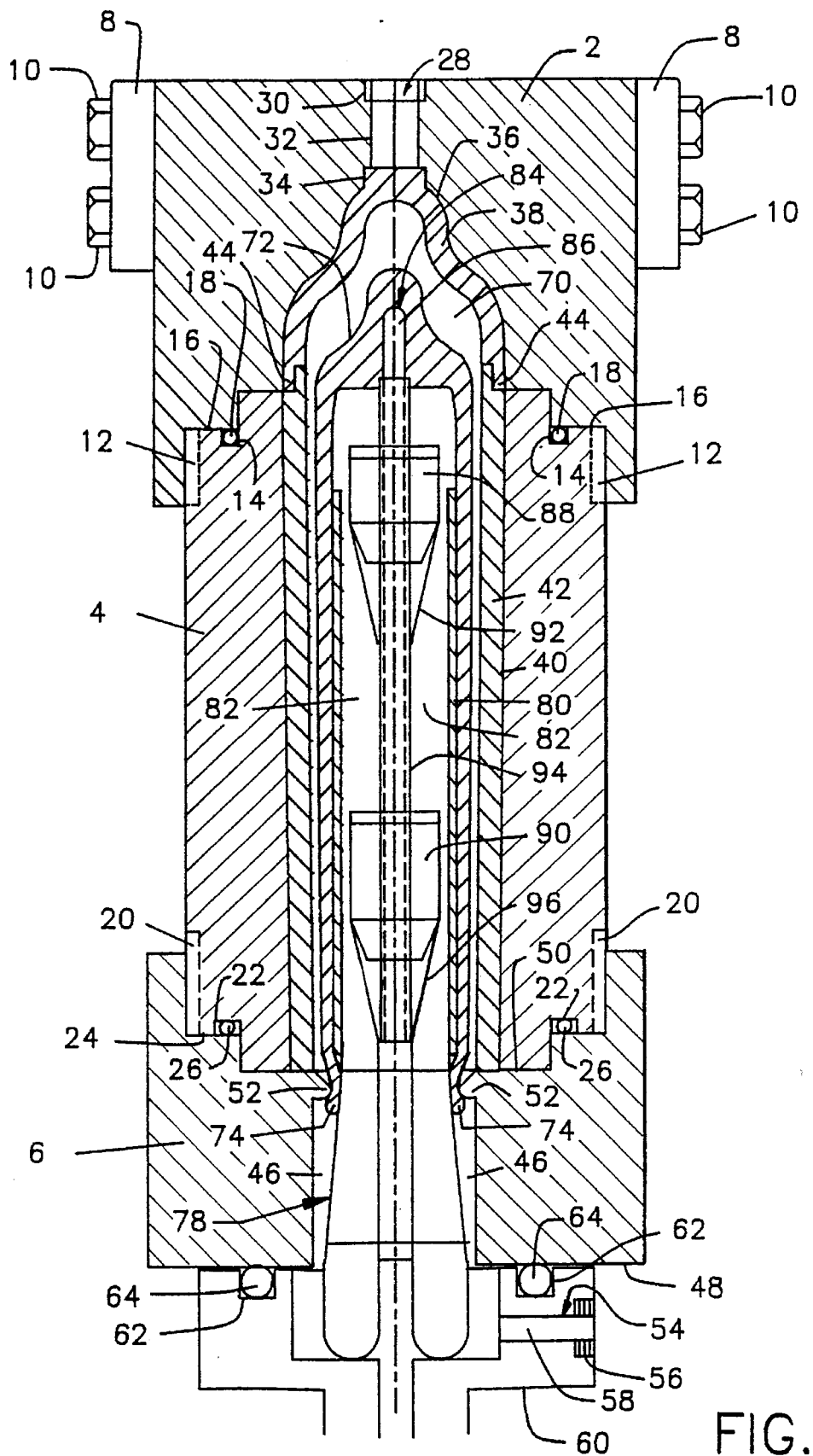
FIG. 2 is a cross sectional view of another embodiment of the invention including an expandable condom holder.

In a preferred embodiment of the invention, as shown in FIG. 2, an expandable condom holder 78 is used, rather than the nonexpandable condom holder 68 of FIG. 1. Other portions of the apparatus shown in FIG. 2 are otherwise identical to that shown in FIG. 1. In this example, the expandable condom holder 78 comprises an elastomer sheath 80 in a sleeve-like configuration, for resiliently holding a plurality of expandable fingers 82 (only two are shown in FIG. 2, but four are used in this example) in position about a cam rod assembly 84 comprising a cam rod 86, a first cam section 88, and a second cam section 90, as shown. As will be described in greater detail below, the expandable fingers 82 each occupy one quadrant of the generally cylindrical expandable condom holder 78. In FIG. 2, the expanded condom holder 78 is shown in its retracted or nonexpanded state. This nonexpanded state is employed during testing of a condom 72, conducted generally as previously described for the embodiment of the invention of FIG. 1. However, in this preferred embodiment, air flows through the space provided between the outside wall of the cam rod 86 and the inside walls of the fingers 82, for inflating and deflating the condom 72 under test.

Figure 15:
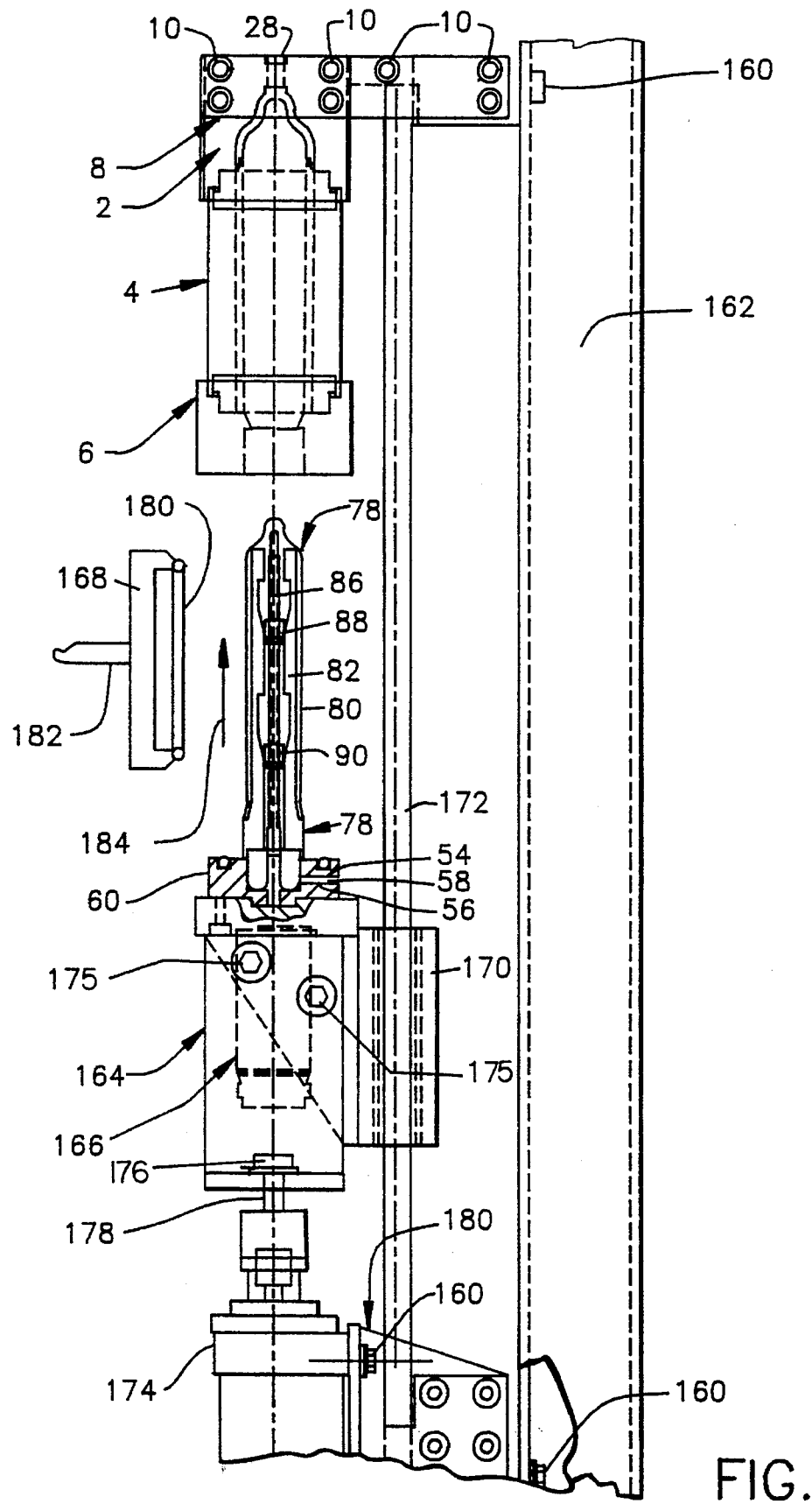
FIG. 15 is a pictorial view with partial cross sectional portions of an embodiment of the invention, including a slide mechanism for moving the condom holder into and out of engagement with the porous liner, a mechanism for operating an expandable condom holder, if employed, and a mechanism for rolling up the condoms.

As shown in FIG. 15, after a condom 72 is tested, the movable platform 60 is moved away from the housing sections 2, 4, and 6, for freeing the expandable condom holder 78 from the porous liner sections 38, 42, respectively. After such withdrawal, the cam rod 86 is pulled in a direction, downward in this example, for causing the first and second cam sections 88 and 90, respectively, to engage first, second, and third inner camming surfaces 92, 94, and 96 of each expandable finger 82, as shown in FIG. 15, for spreading the fingers 82 apart against the tension of the elastomer sheath 80, to the extent necessary for holding the condom 72 tightly against the outside walls of the condom holder 78, to permit the condom 72 to be rolled off of the condom holder 78 more tightly. This cannot be readily accomplished if the condom 72 is loosely held upon the condom holder 78. Expanding the condom holder 78 for insuring that the condom 72 is slightly stretched over the condom holder 78, permits it to be readily rolled off. The mechanisms for accomplishing this will be described in greater detail below in relation to FIG. 15.

Figure 3:
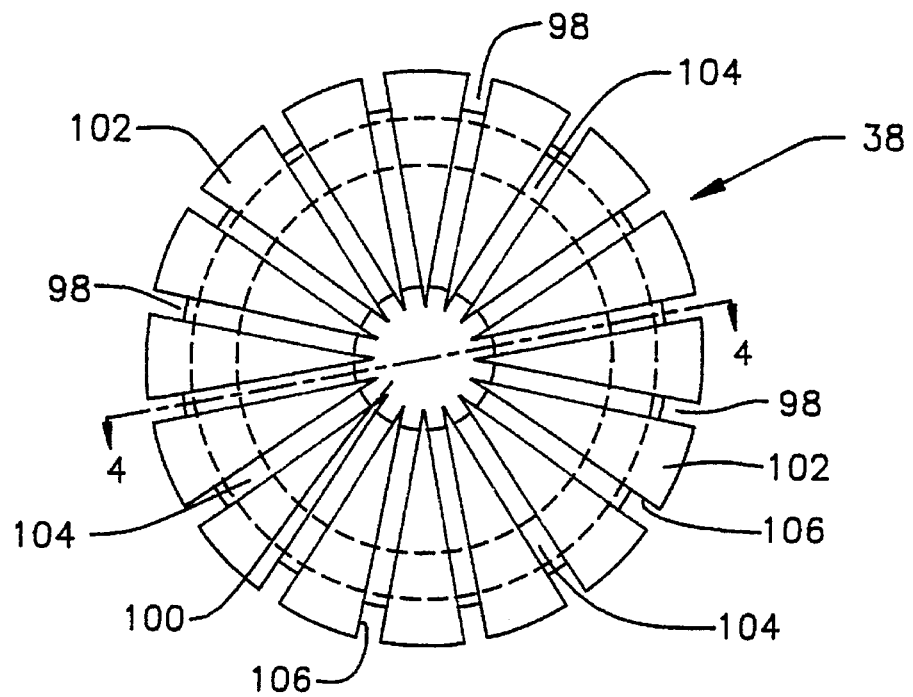
FIG. 3 is a top view of the top section of a porous liner of one embodiment of the invention.
Figure 5:
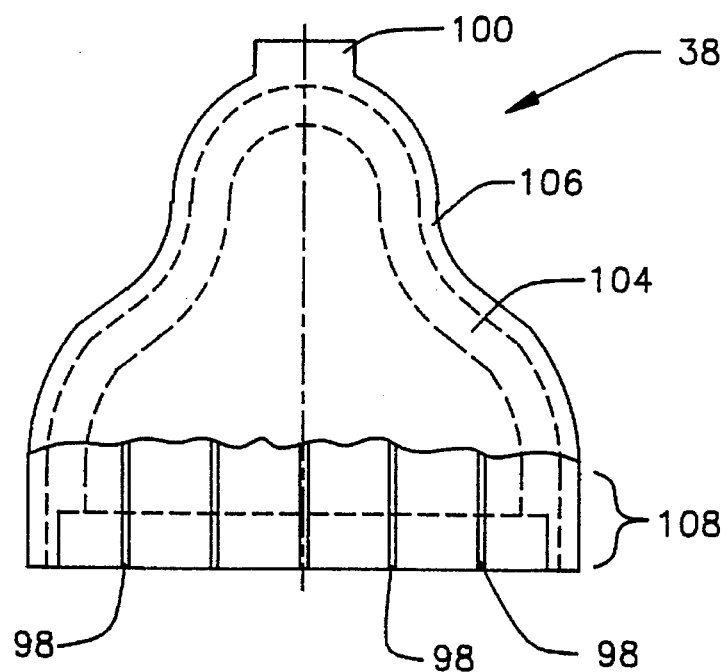
FIG. 5 is a partial side elevational view of the top section of the porous liner of FIG. 3.

In FIG. 3, a top view of the top section 38 of the porous liner is shown. A plurality of grooves or air channels 98 are formed in the top section, as shown. In the uppermost portion of the top section 38 of the porous liner, the grooves 98 are spaced apart and regularly directed from a topmost and centrally located hub section 100. The grooves 98 in the topmost portion are formed between triangular sections 102. With further reference to FIG. 3, and also with reference to the partial pictorial of porous liner section 38 of FIG. 5, and areas where the grooves 98 exist, the thickness of the top porous liner section 38 is equivalent to the thickness of wall section 104. In wall areas where the grooves 98 are not formed, the thickness of the walls is increased by the thickness of the wall segment shown as 106. Also as shown, the grooves 98 extend from the central hub 100, through the upper bell-shaped portion of porous liner section 38, and through the parallel and opposing sidewall portions 108.

Figure 4:
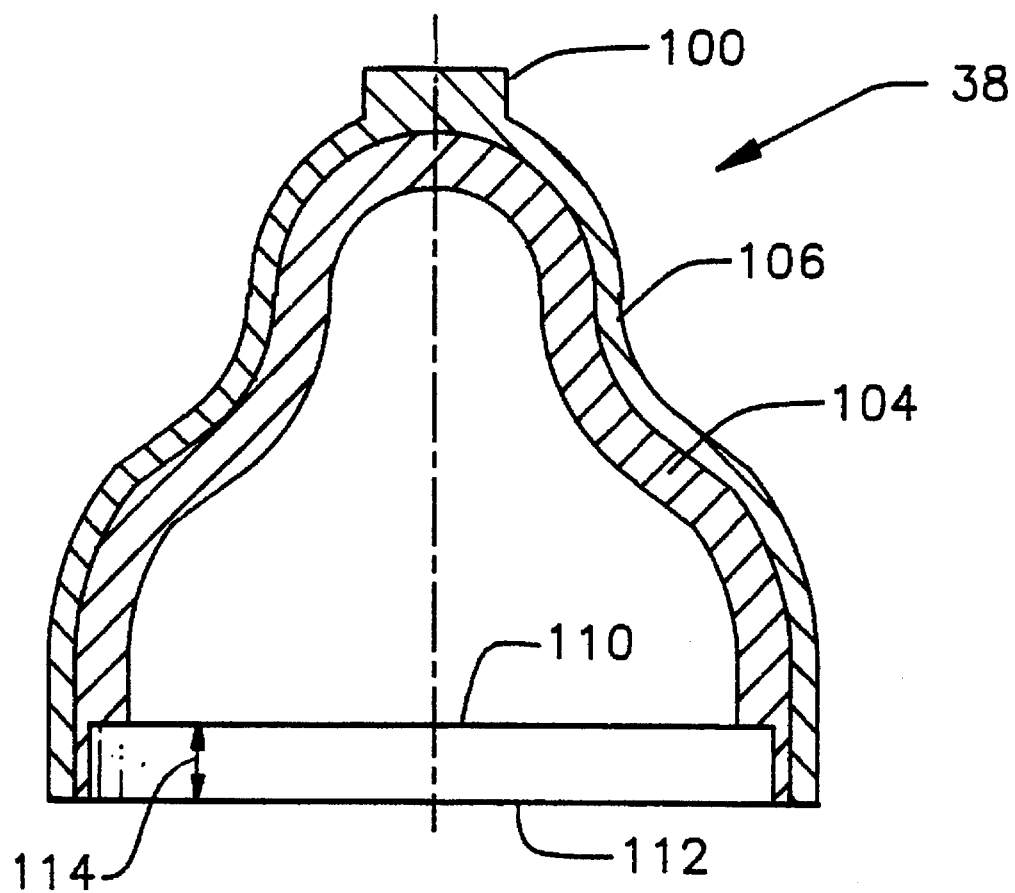
FIG. 4 is a longitudinal cross sectional view of the top section of the porous liner of FIG. 3.

With reference to FIG. 4, a cross sectional view of the top section 38 of the porous liner of FIG. 3 is shown. Note that at the bottom of the section 38, a band-like bottom most portion of the wall portion 104 is cut out. As a result, the bottom 110 of the inner wall portion of wall portion 104 is shorter than and separated by a predetermined distance (see arrow 114) from the bottom 112 of the outer wall portion 106. The predetermined distance 114 between the bottoms 110 and 112 of wall sections 104 and 106, respectively, is dimensioned to provide the gap or radial groove 44 shown in FIGS. 1 and 2, as will be described in greater detail below.

Figure 6:
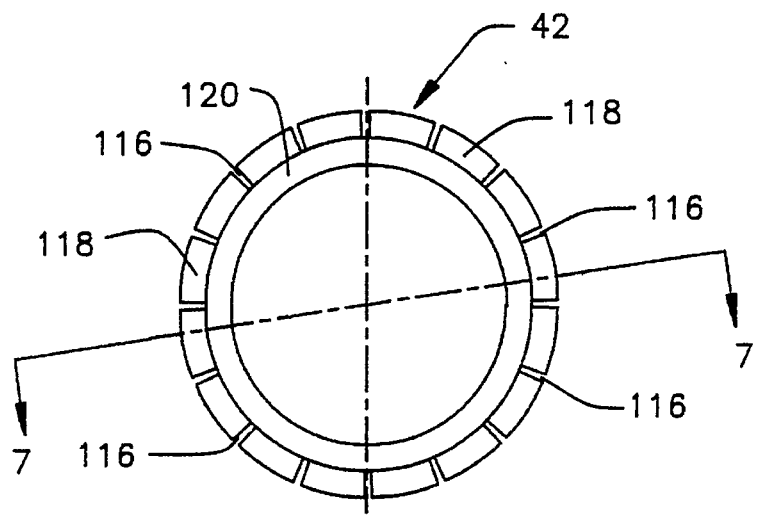
FIG. 6 is a top view of the bottom section of the porous liner of one embodiment of the invention.
Figure 7:
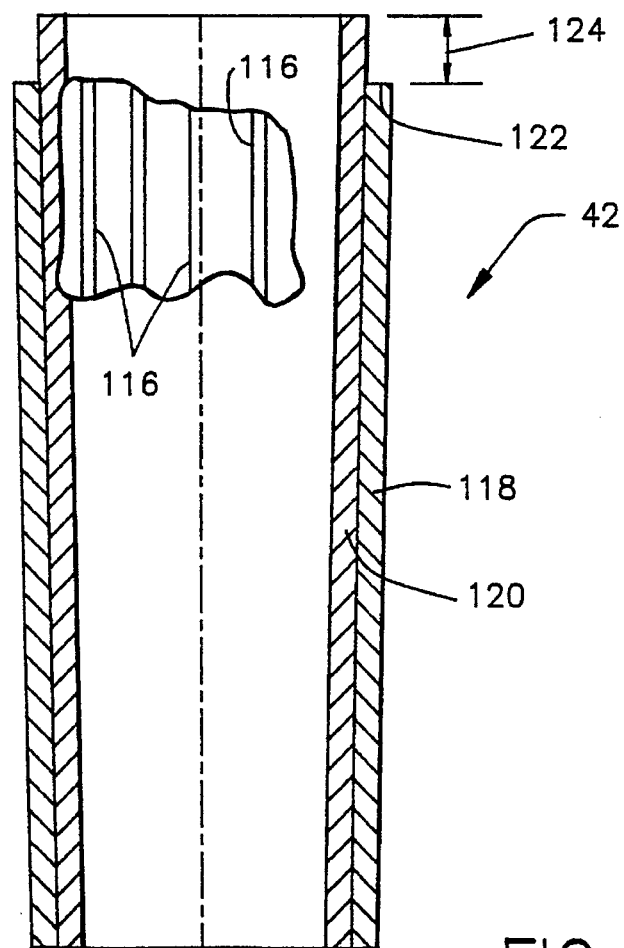
FIG. 7 is a longitudinal cross sectional view of the bottom section of the porous liner of FIG. 6.

A top view, and a side elevational view, are shown in FIGS. 6 and 7, respectively, for the bottom section 42 of the porous liner, in this example. As shown, grooves or air channels 116 are formed or partially cut into the outside side wall portions 118, extending to an interior side wall portion 120, as shown. As further shown in FIG. 7, the interior side wall portion 120 extends beyond the top shoulder 122 of the outside side wall 118, by a predetermined distance indicated by arrow 124. Note that this predetermined distance 124 is made sufficiently greater that the predetermined distance 114, previously described for the extension of the outside wall segment 106 beyond the interior wall segment 104 of the top section 38 of the porous liner, for establishing the desired gap 44.

As previously described, the porous liner comprising the top section 38 that mates with a bottom section 42 is fabricated from a porous material. The size of the pores range from 5 to 20 microns, for example. Typically, the smaller the pore size used, the smaller the holes that can be detected in testing a condom 72 or other prophylactic articles for leaks. For the testing of a condom 72, in order to meet FDA requirements, the pore size is about 10 microns. The presently described porous liner 38, 42, were manufactured to the inventors' specifications by Porex Technologies of 500 Bohannon Road, Fairburn, Ga. 30281-2828, U.S.A. Note that porous liners of some other desired shape may be used for testing prophylactic articles such as gloves, for example. Also, in the preferred embodiment, the thickness of the thinnest wall section of the porous liner should be at least 0.125 in. to withstand pressurization or inflation of a condom 72 under test to about 100 pounds per square inch. As shown in FIGS. 1 and 2, the top section 38 of the porous liner fits snugly within the bell shaped cavity 36 of the top housing section 2, the latter being configured to accomplish this. The bottom section 42 of the porous liner fits snugly within the cylindrical cavity 40 of the intermediate housing section 4, as shown, with the latter being configured to accomplish this. When housing sections 2 and 4 are screwed together, the opposing surface of the interior wall portion 104 of the top section 38 is touching the top surface of the interior side wall portion 120 of the bottom section 42, as shown. Note that the top and bottom sections 38 and 42 are configured to the shape of condoms 72 to be tested. In this example, the top section 38 is bell shaped, and the bottom section 42 is cylindrical with downwardly converging or tapered side portions.

In FIGS. 8, 9, and 10, front elevational, side elevational, and top views, respectively, for each one of the expandable fingers 82 (see FIG. 2) are shown. Each finger 82 includes a rounded and tab-like topmost section 126 from which a centrally located rib 128 projects downward a relatively short distance, and terminates into a cam surface 92 including a flat surface portion 130 for about half of its length, terminating to a diverging sloped surface 132. The diverging surface 132 terminates at a tapered rib-like section 134, the latter terminating at another or second cam surface 96. The cam surface 96, similar to cam surface 92, but of different dimension, includes an upper flat portion 136, and a lower tapered diverging and outwardly slopping surface 138. The outwardly slopping surface 138 terminates at a relatively elongated flat surface 140, which in turn terminates to a relatively narrow foot member 142. The bottom of the foot member 142 includes a slightly widened portion 144. The configuration of the foot member 142 with a widened portion 144, permits air to flow around the foot 142 and through the center portion of the expandable condom holder 78, for inflating a condom 72 under test, as previously described. As shown in the top view of FIG. 10, each expandable finger is configured to traverse an arc $\Theta$ of about 90°, or one quadrant. The elastomer member 80 is positioned around four of the fingers 82 for resiliently securing them together to form the column-like condom holder 78. An engineering prototype of the embodiment of FIG. 2, and FIGS. 15 and 16, was constructed. In FIGS. 8 and 9 certain dimensions are shown for purposes of illustration of the typical size of the prototype apparatus associated with this invention. For example, $d_1$ is 0.574 in.; $d_2$ is 0.30 in.; $d_4$ is 0.063 in.; $d_5$ is 0.125 in.; $d_6$ is 0.130 in.; $d_7$ is 0.260 in.; $d_8$ is 0.227 in.; $d_9$ is 0.50 in.; $d_{10}$ is 0.75 in.; $d_{11}$ is 3.25 in.; $d_{13}$ is 1.313 in.; $d_{14}$ is 0.75 in.; $d_{15}$ is 2.313 in.; $d_{16}$ is 0.179 in.; $d_{17}$ is 0.078 in.; $d_{18}$ is 0.25 in.; $d_{19}$ is 0.30 in.; and $d_{20}$ is 0.063 in.

Figure 11:
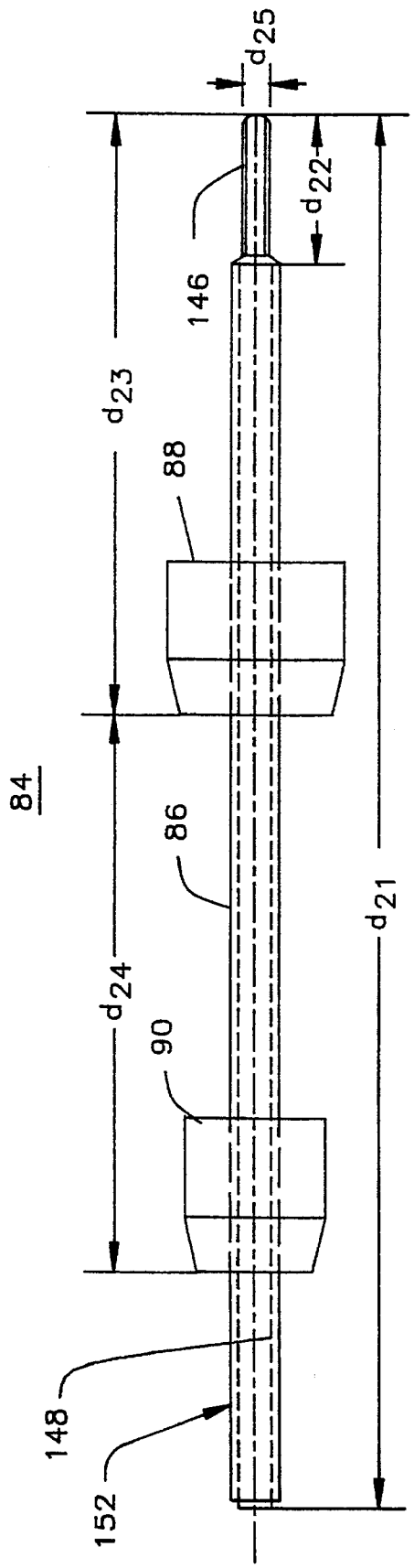
FIG. 11 is a front elevational view of a cam rod subassembly of the expandable condom holder of FIG. 2.
Figure 12:
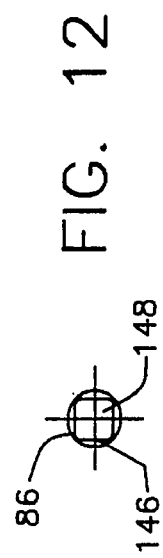
FIG. 12 is an elevational view of one end of the cam rod subassembly of FIG. 11.

In FIG. 11, the cam rod assembly 84 is shown. The cam rod 86 has a length $d_{21}$ of 7.06 in., in this example; a reduced stub-like top end portion 146 has a length $d_{22}$ of 0.569 in.; and has a hollow core portion 148. The first cam section 88 is mounted upon the cam rod 86 with its bottom surface a distance $d_{23}$ of 2.625 inch from the tip of the reduced end portion 146 of cam rod 86. The second cam section 90 is rigidly mounted upon cam rod 86 at a distance $d_{24}$ of 3.25 in between its bottom surface and the bottom surface of the first cam section 88. The width $d_{25}$ of the reduced stub-like top end portion 146 is about 0.188 inch. The top end of the cam rod 86 facing the end of the reduced top end portion 146 is shown in FIG. 12 to have a chamfer.

In FIG. 13A, a front elevational view of the first cam section 88 is shown, and a side elevational view thereof is shown in FIG. 13B. As shown, a threaded hole 150 is formed through the center of the cam section 88 for screwing onto a threaded outer portion 152 of cam rod 86 (see FIG. 11). In this example, the front of the first cam section 88 is square having a dimension $d_{26}$ of 0.607 inch diverging side portions extend rearward from the front face 154, and each has a maximum dimension $d_{27}$ of 0.759 inch. The quarter inch threaded hole 150 is centered upon the front face 154. As shown in 13B, the tapered portion of can section 88 has a width $d_{28}$ of 0.25 inch, and the overall length $d_{29}$ of this cam section 88 is 0.625 in., in this example. Also in this example, as shown in the front elevational view of FIG. 14A, and side elevational view FIG. 14B, for the second cam section 90, the front face 158 is square have a dimension $d_{30}$, in this example, of 0.544 inch. The width of the tapered sides 160, which diverge towards the rear have a maximum dimension $d_{31}$ of 0.663 inch. As shown in FIG. 14B, the length $d_{32}$ of the rearward sloping side surfaces 160 is 0.25 in., and the overall length of the second cam section 90 $d_{33}$ is 0.625 inch in this example. Other dimensions can be used, depending upon the application. Also, a threaded hole 161 is centered upon the front face 158. However, in this application, for purposes of illustration, the dimensions given for the cam rod assembly 84 components, and the expandable fingers 82, provide the necessary expansion of the condom holder 78, for permitting a typical condom 72 to be rolled off holder 78.

As shown in FIG. 15, various embodiments of the present invention for testing condoms 72 or other prophylactic articles can be automated to a large extent. As shown, the bracket 8 has one end rigidly mounted via bolts 160 (only one is shown) to an upright frame member 162. In this manner, the housing sections 2, 4, and 6 are rigidly secured over the expandable condom holder 78 carried on the movable platform 60, in this example. The movable platform 60 is rigidly mounted on the top of a bracket 164. Also, an air cylinder 166 is rigidly secured to the bottom portion of the movable platform 60, and includes means (not shown) for connecting a control rod from the cylinder 166 to the cam rod 86, for selectively operating the air cylinder 166 to pull the cam rod 86 downward for moving cams section 88 and 90 to a position causing the expandable FIGS. 82 to expand upon the elastomer sheet 80, for firmly securing a condom 72 to permit it to be rolled off via the rotating belt or brush assembly 168. The bracket 164 is rigidly connected to a bushing 170 mounted upon a linear slide rod 172 via bolts 175. The bottom of the bracket 164 is rigidly secured to a second air cylinder 174 via securing nuts 176. The securing nut 176 rigidly connects bracket 164 to a push rod 178 of air cylinder of 174. A cylinder mounting bracket 180 is secured at one end to air cylinder 174 via bolts 160, and at its other end to the frame member 162 via bolts 160, as shown. The air cylinder 174 is selectively actuated for moving the condom holder 78 up and down upon the linear slide rod 172. Accordingly, air cylinder 174 can be operated for pushing condom holder 78 into engagement with the porous liner sections 38 and 42, as previously described, for testing a condom 72. And after testing, air cylinder 174 can be operated for withdrawing condom holder 78 from the porous liner sections 38 and 42 to the position shown in FIG. 15. Also, the rotating belt or brush assembly 168 comprises a rotating belt or brush 180, which can be selectively pushed against a condom 72 mounted on expandable condom holder 78, through means not shown for pushing actuating rod 182 portion toward the condom holder 78. Note that the belt or brush 180 moves in the direction of arrow 184, for rolling condoms 72 off of condom holder 78.

Figure 16:
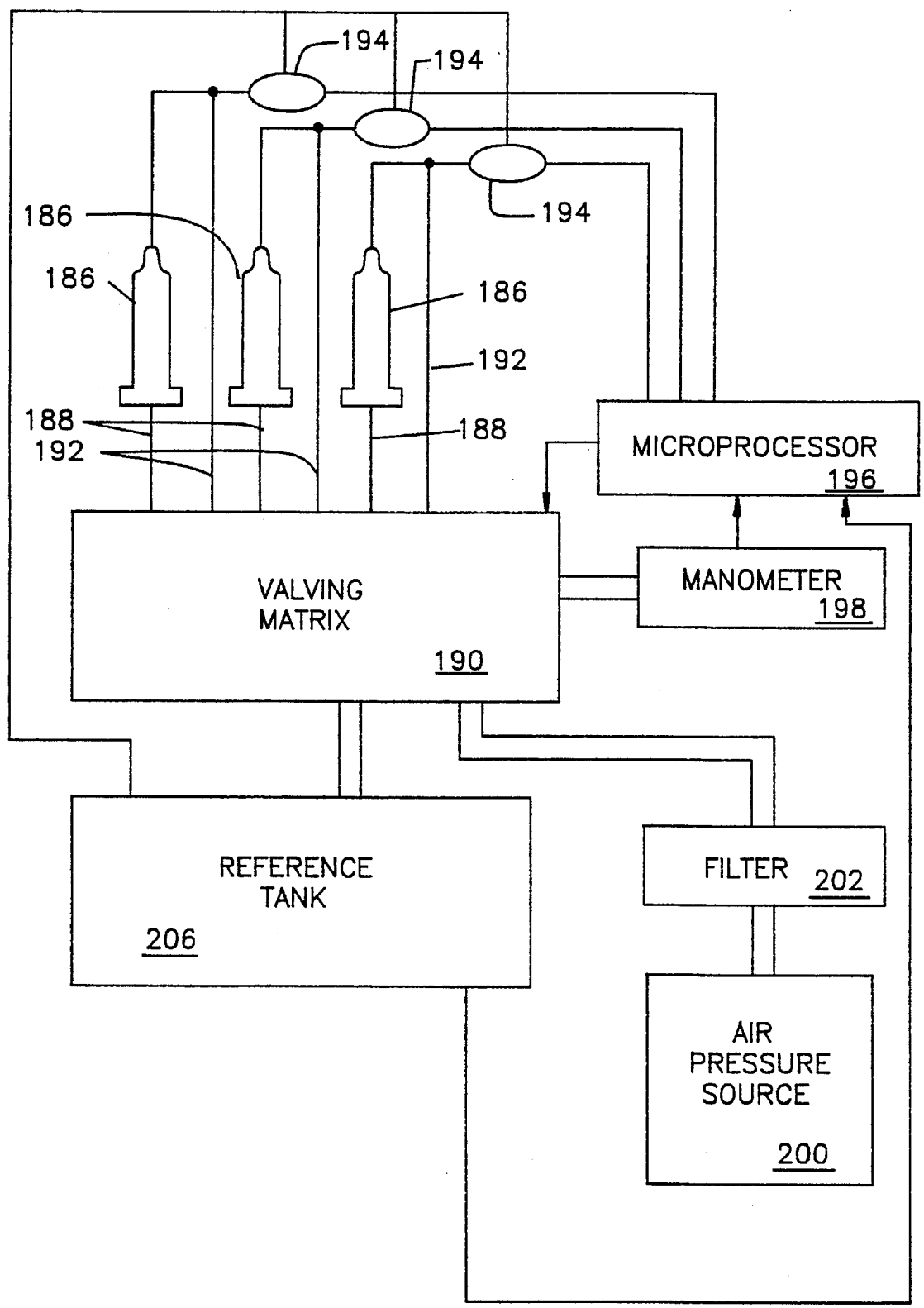
FIG. 16 shows a block diagram of another embodiment of the invention for at least partially automating the testing of condoms.

Reference is now made to FIG. 16 for a description of equipment for testing condoms 72 for holes, in accordance with the method of various embodiments of the present invention. In one embodiment, a plurality of test apparatus is symbolically shown as porous liner shaped elements 186, each meant to incorporate the apparatus of FIG. 15, in this example. Air lines or air conduits 188 are connected between a valving matrix 190 and the air ports 54 of each one of the test apparatus 186, respectively. Other air lines or air conduits 192 are connected between the valving matrix 190 and air ports 28 of the respective testing apparatus 186. The air lines 192 are also connected to input ports of pressure transducers 194, respectively. The output ports of the pressure transducers 194 are individually connected for providing pressure signals to a microprocessor 196. A manometer 198 is connected to microprocessor 196 and valving matrix 190. An air pressure source 200 is connected through a filter 202 to valving matrix 190. The air pressure source 200 provides a plurality of different pressures via individual pressure lines (not shown) for test pressure, condom extraction, dust blow out, condom holder movement, condom holder expansion, porous liner expansion, and reject condom blow off, respectively. A reference tank 206 provides a stable pressure reference signal to the pressure transducers 194, and microprocessor 196. Control of this equipment in any of the modes of operation is effected by the microprocessor 196. Microprocessor 196 operates valves (not shown) within the valving matrix 190, so as to couple the test apparatus 186 to the air pressure source 200, and the manometer 198. Signals representing whether or not microprocessor 196 finds a leak in each of the condoms 72 under test are provided via individual test apparatus assembly 186, respectively.

Figure 17:
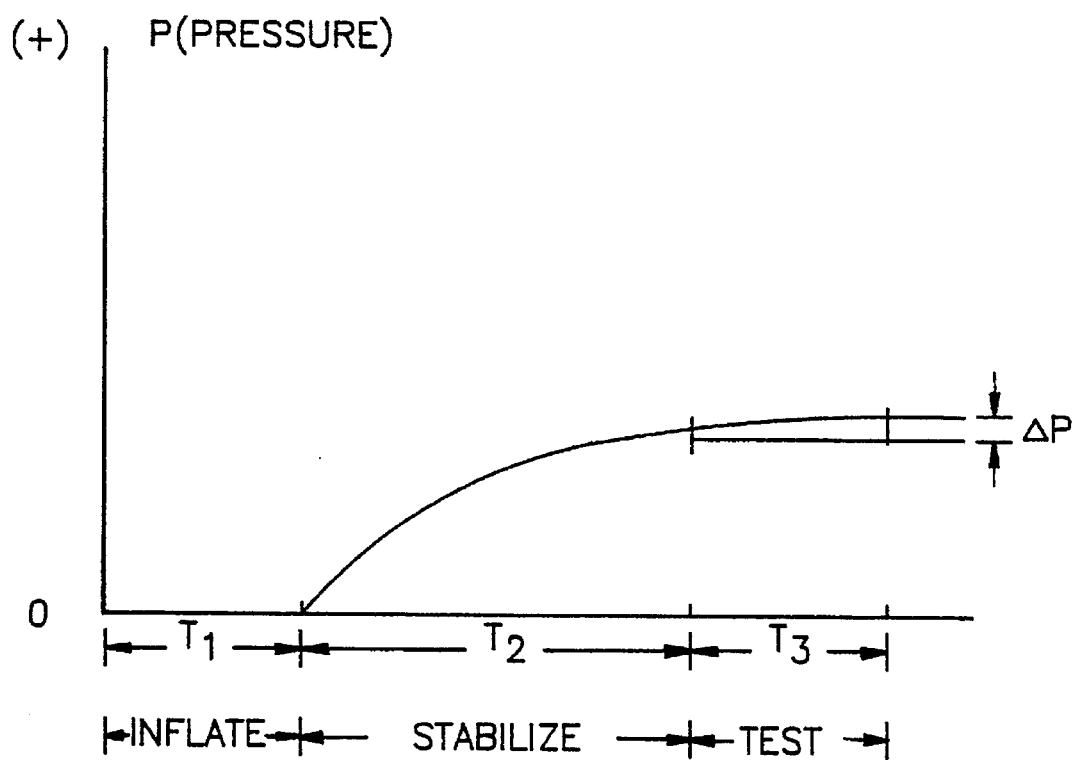
FIG. 17 shows a graph indicating an example of another embodiment of the invention for time periods for inflation of a condom under test, stabilization of the pressure in the inflated condom, and testing for the rate of change of pressure, in accepting or rejecting a condom or other prophylactic device being tested.

The pressure transducers 194 are used to measure the pressure within an associated air port 28 of the associated test apparatus 186, and to provide a corresponding pressure signal to microprocessor 196. The associated pressure transducer 194 is used to compare the pressure within air port 28 against the pressure within a reference tank 206, for obtaining a measure of the rate of change of air pressure within the associated air port 28. The manometer 198 is used for measuring the absolute pressure within a condom 72 under test. The filter 202 is used to ensure that pressurized air from the air pressure source 200 is free of contaminants before being delivered to the valves of the valving matrix 190. The microprocessor 196 is programmed to carry out the required testing sequences, and required reporting. The programming includes opening and closing appropriate ones of the valves of the valving matrix 190 at required times, processing signals representative of various measured pressures or rates of change in pressure, fault testing, and so forth. In this regard, a typical testing cycle, as will be described in greater detail below, is shown in FIG. 17.

During a first period of time $T_1$ a condom 72 under test is inflated via microprocessor 196 operating valving matrix 190 to connect air pressure source 200 to an air port 54 of the associated test apparatus 186. After the condom 72 is inflated to within a desired pressure range, typically from 20 to 100 pounds per square inch, a stabilization period $T_2$ is provided for stabilizing the pressure in the associated test apparatus 186. After the stabilization of pressure, a test mode is entered over a time period $T_3$ for measuring the rate of change of pressure within the associated air port 28 of the test apparatus 186. If the rate of change of pressure over predetermined periods of time exceeds a predetermined value, condom 72 under test is rejected, otherwise it is accepted. Note that the microprocessor 196 can further be programmed, for example, to conduct concurrent testing of three condoms 72, in this example, in a sequence where each one of the respective test apparatus 186 is in a different one of the three periods $T_1$, $T_2$, and $T_3$ of operation, respectively. Also, in a given application, the test apparatus and testing system can be designed to simultaneously test any desired number of condoms 72, to a practical limit, using the various embodiments of the present invention.

A method for performing the testing of a condom 72 in accordance with various embodiments of the present invention will now be described in detail with particular reference to FIGS. 2, 15, 16, and 17. The microprocessor 196 is programmed to automatically carry out the required steps. The first step is to position the condom holder 78 as shown in FIG. 15, but with the expandable condom holder 78 in its nonexpanded state as shown in FIG. 2. A condom 72 to be tested is then placed over the expandable condom holder 78.

The next step is to operate air cylinder 174, in this example, for moving the expandable condom holder 78 into the porous liner 38, 42. Note that a cam or other means can be used to provide the function of air cylinder 174. Sufficient force must be applied by air cylinder 174 to form an air tight seal between the metal seal ring 52 of the bottom housing section 6, the elastomer sheet 80, and the bottom of the condom 72, as shown in FIG. 2.

The next step is to operate the valving matrix 190 for connecting the air pressure source 200 to the air port 54, while venting the air port 28 to the atmosphere, for initiating the first period $T_1$, for inflating the condom 72 with a given air pressure while allowing the air space between the porous liner 38, 42 and housing sections 2, 4, and 6, respectively, to vent to the atmosphere. Note that the inflated condom 72 now has its outside walls forced against the opposing inside walls of the porous liner 38, 42.

After the inflation period $T_1$, the next step is to operate valving matrix 190 to seal or close off the associated air port 28 to isolate the space between the porous liner section 38, 42, and housing sections 2, 4, and 6, respectively, from the atmosphere.

The next step is to retain the test apparatus in its last mode of operation for a second period of time $T_2$ sufficient to permit the air pressure in the spaces between the porous liner 38, 42, and housing sections 2, 4, and 6, respectively, to stabilize.

After the stabilization period $T_2$, a third time period $T_3$ is entered for measuring the rate of pressure increase in the space between the porous liner 38, 42, and housing sections 2, 4, and 6, respectively. This measurement is made by operating valving matrix 190 to maintain a given air pressure from air pressure source 200 to air port 58, while comparing the pressure signal from the associated pressure transducer 194 with the pressure of the reference tank 206. This is accomplished by measuring the pressure at the beginning of the period $T_3$, and at the end of the period $T_3$, and dividing the increase of pressure if any by the time $T_3$.

The microprocessor 196 next compares the measured rate of pressure increase against a predetermined standard value. If the measured rate of pressure increase over a predetermined period of time exceeds the predetermined acceptance value, the condom 72 is rejected, otherwise it is accepted.

The valving matrix 190 is operated in the next step for connecting the associated air ports 54 and 28 of the test apparatus 186 to the atmosphere for venting air pressure from inside the condom 72 under test.

The next step is to operate air cylinder 174 for withdrawing the expandable condom holder 78 with the condom 72 from the porous liner 38, 42 and associated housing 2, 4, and 6. During this withdrawal step, in a preferred embodiment, the valving matrix 190 is also operated for injecting pressurized air from air source 200 into the associated air port 28, for substantially preventing the condom 72 from sticking to the inside wall surface of the porous liner sections 38, 42, thereby aiding in extraction of the condom 72 on the condom holder 78.

If the condom 72 has been rejected, the next step is to blow the rejected condom 72 off of the expandable condom holder 78, in this example. This is accomplished by extracting condom holder 78 from housing 2, 4, 6, followed by injecting pressurized air into port 54.

Alternatively, if the condom 72 has been accepted, the next step is to operate air cylinder 166 for pulling the cam rod assembly 84 downward or in a direction for moving the expandable fingers 82 away from one another to the expanded position as shown in FIG. 15. Note that in a practical system, this step may be carried out regardless of whether a condom 72 has been rejected and previously blow off the condom holder 78, or accepted and remains on the condom holder 78.

The next step is to roll accepted condoms 72 off the expandable condom holder 78 by moving the rotating belt or brush 180 against the condom 72. The rolled condom 72 automatically pops off of the top of the condom holder 78, whereafter the condom 72 is retrieved for packaging.

The next step is to operate air cylinder 166 for moving the cam rod 86 upward to disengage the cam sections 88 and 90 from the expandable fingers 82, for returning the expandable condom holder 78 to its nonexpanded state. Note that the elastomer sheet 80 acts as a return spring, for providing the force for moving the expandable fingers 82 towards one another as the cam sections 88 and 90 are disengaged therefrom.

The next step is to operate the valving matrix 190 for applying high pressure air from air pressure source 200 to air port 28, for blowing out any powder that may have collected upon the inside surfaces of the porous liner sections 38, 42 from the condom 72 that had been tested.

The last remaining step in the illustrated preferred cycle of operation is to operate the valving matrix 190 for connecting air ports 28 and 54 to the atmosphere, thereby venting the space between the porous liner sections 38, 42, and housing sections 2, 4, and 6, respectively, to the atmosphere.

Although various embodiments of the invention have been shown and described herein, they are not meant to be limiting. Those of skill in the art may recognize certain modifications to these embodiments, which modifications are meant to be covered by the spirit and scope of the invented claims. For example, during a typical cycle of testing a condom 72, in the inflation period $T_1$, the manometer 198 can be used for determining whether the pressure within the condom is increasing at a predetermined rate, which if not obtained will result in the microprocessor 196 operating to reject the condom 72. Also, the microprocessor 196 can further be programmed to keep track of the number of condoms 72 rejected during inflation periods, for determining whether the test apparatus 186 should be checked for proper operation if an excessive number of condom 72 are so rejected. Also, the microprocessor 196 can be programmed to monitor the operation of the test system, by keeping track of the number of condoms 72 rejected and the number accepted by each test apparatus 186. If there are no rejects for a predetermined number X of tests or no acceptances for Y tests, the system is shut down for servicing of the test apparatus 186. Also, programming can provide that if there are no rejects made by the given test apparatus 186 for a predetermined number of tests or no acceptances for another predetermined number of tests, that the system should be shut down for servicing.

Another modification that can be made, for example, includes the use of a tag gas for inflating a condom 72 instead of air, whereby instead of testing for increases of pressure in a region outside of the condom 72, a detector can be employed for detecting the presence of tag gas outside the condom 72 to detect a leak or hole in the condom 72. Alternatively, both a tag gas and a rate of change of differential pressure, as previously described, can be employed at the same time for testing a condom 72. Still further, in another modification or embodiment, a low molecular weight gas, such as Helium, can be used in place of pressurized air, for reducing test time due to the faster flow rate of Helium through a hole in a condom 72 relative to air. Also, although condoms have been used in illustrating various embodiments of the invention, many other prophylactic devices can be tested by the present embodiments of the invention, and the associated porous liner 38, 42 can be shaped as required.

Another modification for the invention, representative of an alternative embodiment, is to test a condom 72 by keeping the air port 58 of the bottom housing section open to the atmosphere, while drawing a vacuum at air port 28. Relative to FIGS. 1, 2, and 15, with the condom holder 68 or expandable condom holder 78 inserted with condom 72 within the porous liner 38, 42, the condom 72 will in effect be inflated and in this case pulled against the inside walls of the porous liner 38, 42. Leaks can then be detected by monitoring the decrease in vacuum within air port 28, or rate of increase of pressure therein, for detecting leaks in condom 72. As in prior embodiments, the rate of change of pressure is compared against a standard or predetermined pressure for determining whether a condom 72 under test is to be accepted or rejected. Note that the porous liner 38, 42 is in two sections because a tapered shape is required for testing tapered condoms, but the porous liner can be provided in one piece for testing non-tapered or straight walled condoms. Also, note that the metal ring seal 52 can be replaced by an elastomeric inflatable seal, for example.

What is claimed is:

1. A system for testing elastic and flexible prophylactic devices for holes, comprising:

a rigid porous hollow jacket liner body having a unitary configuration, and having an interior cavity conformed to the exterior shape of the device under test, said cavity being sized to control the stretching of said device during testing, and said liner further including a plurality of pores throughout its body for permitting gas to flow therethrough;

retaining means for retaining a device under test within the interior cavity of said liner;

means for providing a sealed enclosed space about outer walls of said liner;

means for creating a given difference in gas pressure between the space within said device and said enclosed space proximate outer walls of said porous liner, said difference in gas pressure causing said device to in effect inflate and expand with exterior walls thereof being stretched or pushed or pulled against inside walls of said interior cavity; and means for measuring changes in the differential in gas pressure between the sealed enclosed space proximate the outer walls of the porous liner and a reference gas pressure that is stable during the test period, for determining whether holes in said device are such to accept or reject said device for its intended use.

2. The system of claim 1, wherein said means for creating the difference in gas pressure increases the pressure in the space within said device under test with respect to atmospheric pressure sufficient to inflate said device to a given pressure.

3. The system of claim 1, wherein said means for providing a sealed enclosed space includes:

a housing having top, bottom, and side portions, and an interior cavity conformed to the exterior shape of said porous liner, for retaining said liner therein, the space therebetween being said space proximate outer walls of said porous liner; and a first gas port at the top of said housing, said first gas port including a gas passageway extending into the cavity of said housing, for permitting gas to flow between the cavity of said liner, through pores of said liner, and said first gas port.

4. The system of claim 3, wherein said liner further includes:

a plurality of spaced apart longitudinal grooves about exterior walls of said liner, said grooves extending from a topmost portion of said liner proximate said first air port of said housing with said liner installed therein to lowermost portions of said liner, for providing an open path for gas flow between said first port and a portion along a wall of said liner proximate a hole in said device under test on an opposite side of said liner wall portion, thereby preventing the gas having to flow from the hole in the device through a tortuous pathway of pores in the length of said liner material between said first gas port and the position of the hole though said device.

5. The system of claim 1, wherein said retaining means includes:

a holder for retaining the device thereon;

slide means connected to a bottom portion of said holder, for selectively moving said holder into the interior cavity of said liner for testing a device, or for withdrawing said holder with said device from said liner subsequent to testing said device.

6. The system of claim 5, wherein said slide means includes:

a platform having a recess on a top surface retaining a bottom portion of said holder;

a first bracket having one end rigidly attached to said platform, and another end;

a linear slide rod;

a bushing slidable mounted upon said slide rod, with the other end of said first bracket being rigidly secured to said bushing;

an elongated support member;

means for attaching said linear slide rod to said support member in spaced apart but parallel relation thereto;

means for attaching said liner to said support member, for suspending an entry opening of said liner over said holder; and first motive means suspended from said support member and under said platform, a push rod of said motive means being attached to an underside of said platform, whereby said first motive means is operable for moving said platform selectively toward said porous liner for inserting said holder into said liner, and for moving said platform away from said liner for removing said holder from said liner.

7. The system of claim 6, wherein said platform further includes a second gas port including a gas passageway through a wall of said platform, for permitting gas to flow between said second gas port and an interior volume of said device under test; and said gas pressure differential creating means being connected between said first and second gas ports.

8. The system of claim 6, further including:

said holder including means selectively operable for expanding said holder slightly to permit said prophylactic device to be rolled off after testing, and removal of said holder from said liner.

9. The system of claim 8, further including:

means selectively actuable for engaging said device on said holder, for automatically rolling said device up for removal from said holder.

10. A jacket liner for use in testing an elastic and flexible prophylactic device for holes, comprising:

a rigid hollow body having a unitary configuration, and a closed end and an open end;

a cavity in said body being configured to conform substantially to and be larger than the outside configuration of a prophylactic device to be tested, whereby when a said prophylactic device is inflated within said cavity, substantially all of the exterior walls of said prophylactic device will expand and stretch and be forced into contact with opposing interior walls of said cavity; and a plurality of pores formed throughout said hOllow body, for gas to flow from within said prophylactic device, through holes in walls of said prophylactic device, and through said pores of said hollow body to gas detection apparatus disposed to collect and sense gas released about the exterior of said liner.

11. The liner of claim 10, wherein said prophylactic device is a condom, and said cavity in said body is configured to the shape of the condom.

12. A system for testing a condom for holes, comprising:

a rigid porous hollow jacket liner having walls forming an interior cavity conformed to the exterior wall shape of said condom to be tested, said cavity being sized to control the stretching of said condom during testing, said walls of said liner including a plurality of pores for permitting gas to flow therethrough;

means for providing a sealed enclosed space about outer walls of said liner;

a condom holder for retaining a substantial portion of a condom within the interior cavity of said liner for testing;

means for creating a given difference in gas pressure between an interior space of said condom and the enclosed space proximate outer walls of said liner, said difference in gas pressure causing said condom to inflate and expand with exterior walls thereof being pushed or pulled against inside walls of said interior cavity of said body; and means for measuring changes in the differential in gas pressure between the enclosed space proximate the outer walls of the porous liner and a reference gas pressure that is stable during the test period, for determining whether said condom should be accepted or rejected for its intended use.

13. The system of claim 12, wherein said means for creating the difference in gas pressure increases the pressure in the space within said condom with respect to atmospheric pressure sufficient to inflate said condom to a given pressure.

14. The system of claim 12, wherein said means for providing a sealed enclosed space includes:

a housing having top, bottom, and side portions, and an interior cavity conformed to the exterior shape of said rigid porous liner, for retaining said liner therein, the space therebetween being said enclosed space proximate outer walls of said liner; and a first gas port at the top of said housing including a gas passageway extending into the cavity of said housing, for permitting gas to flow between the cavity of said liner, through pores of said liner, and said first gas port.

15. The system of claim 14, wherein said liner further includes:

a plurality of spaced apart longitudinal grooves about exterior walls of said liner, said grooves extending from a topmost portion of said liner proximate said first air port of said housing with said liner installed therein to lowermost portions of said liner, for providing an open path for gas flow between said first port and a portion of a wall of said liner proximate a hole in said condom on an opposite side of said liner wall portion, thereby preventing the gas having to flow from the hole in the condom through a tortuous pathway of pores in the length of said liner material between said first gas port and the position of the hole through said condom.

16. The system of claim 14, wherein said retaining means includes:

a holder for retaining said condom thereon; and slide means connected to a bottom portion of said holder, for selectively moving said holder into the interior cavity of said liner for testing said condom, or for withdrawing said holder with said condom from said liner subsequent to testing said condom.

17. The system of claim 16, wherein said slide means includes:

a platform having a recess on a top surface retaining a bottom portion of said holder;

a first bracket having one end rigidly attached to said platform, and another end;

a linear slide rod;

a bushing slidable mounted upon said slide rod, with the other end of said first bracket being rigidly secured to said bushing;

an elongated support member;

means for attaching said linear slide rod to said support member in spaced apart but parallel relation thereto;

means for attaching said porous liner to said support member, for suspending an entry opening of said porous liner over said holder; and first motive means suspended from said support member and under said platform, a push rod of said motive means being attached to an underside of said platform, whereby said first motive means is operable for moving said platform selectively toward said porous liner for inserting said holder into said liner, and for moving said platform away from said liner for removing said holder from said liner.

18. The system of claim 17, further including:

said holder including means selectively operable for expanding said holder slightly to permit said condom to be rolled off after testing, and removal of said holder from said porous liner.

19. The system of claim 18, further including:

means selectively actuable for engaging said condom on said holder, for automatically rolling said condom up for removal from said holder.

20. The system of claim 15, wherein said liner further includes:

an independent top section conformed to the shape of an uppermost portion of said condom; and an independent bottom section conformed to the shape of the remaining lower portion of said condom, said bottom section including an uppermost circumferential shoulder portion configured to be joined with a lowermost circumferential shoulder portion of said top section to form said liner with a substantially continuous inside wall.

21. The system of claim 17, wherein said platform further includes a second gas port including a gas passageway through a wall of said platform, for permitting gas to flow between said second gas port and an interior volume of said condom; and said gas pressure differential creating means being connected between said first and second gas ports.

22. The system of claim 20, wherein said liner further includes said uppermost shoulder of said bottom section including an upward projecting inner wall portion having a top edge for abutting against a bottom edge of an inner wall of said top section, said top section further including a downward projecting outer wall portion overlapping but shorter in length than said inner wall portion of said bottom section, thereby providing a gap or circular channel between outer wall portions of said top and bottom sections, thereby avoiding the necessity of aligning longitudinal grooves of said top and bottom sections to provide an open passageway for gas therebetween.

23. The system of claim 22, wherein said housing further includes:
   a top section for retaining therein said top section of said liner, said first gas, port being in said top section of said housing;
   an intermediate section for retaining therein said bottom section of said liner;
   a bottom section containing an interior cavity opening into an interior cavity of said intermediate section, the interior cavity of said intermediate section opening into an interior cavity of said top section;
   means for connecting said top section to said intermediate section with a gas tight seal therebetween; and
   means for connecting said intermediate section to said bottom section with a gas tight seal therebetween.

24. The system of claim 16, further including:
   means for providing a gas tight seal between lowermost portions of interior walls of said housing, said condom, and said holder; and
   said holder further including a gas pathway for permitting gas to flow from a second gas port of said housing, through an open central portion of said holder, and into said condom, for inflating said condom after said holder with said condom is inserted into said liner within said housing.

25. A jacket liner for use in pressure testing a condom for holes, comprising:
   a hollow body having a unitary construction, and having a closed end and an open end;
   a cavity in said body being configured to conform substantially to the outside configuration of said condom to be tested, whereby when said condom is inflated within said cavity, substantially all of the exterior walls of said condom will be forced into contact with opposing interior walls of said cavity; and
   a plurality of pores formed throughout said hollow body, for gas to flow from within said condom through holes in walls of said condom, and through said pores of said hollow body to gas detector apparatus disposed to collect and sense gas released about the exterior of said liner.

* * * * *